United States Patent
Liu et al.

(10) Patent No.: US 9,456,484 B2
(45) Date of Patent: Sep. 27, 2016

(54) LIGHT-EMITTING DEVICE CIRCUIT AND METHOD OF OPERATING THEREOF

(71) Applicant: EPISTAR CORPORATION, Hsinchu (TW)

(72) Inventors: Hsin-Mao Liu, Hsinchu (TW); Zong-Xi Chen, Hsinchu (TW)

(73) Assignee: EPISTAR CORPORATION, Hsinchu (TW)

( * ) Notice: Subject to any disclaimer, the term of this patent is extended or adjusted under 35 U.S.C. 154(b) by 183 days.

(21) Appl. No.: 13/656,041

(22) Filed: Oct. 19, 2012

(65) Prior Publication Data

US 2014/0111104 A1    Apr. 24, 2014

(51) Int. Cl.
*H05B 37/00* (2006.01)
*H05B 33/08* (2006.01)

(52) U.S. Cl.
CPC ........ *H05B 33/089* (2013.01); *H05B 33/0809* (2013.01); *H05B 33/0887* (2013.01); *Y02B 20/341* (2013.01)

(58) Field of Classification Search
CPC ...................... H05B 33/0815; H05B 41/36
USPC ............... 315/200 R, 224, 291, 302, 307
See application file for complete search history.

(56) References Cited

U.S. PATENT DOCUMENTS

| | | | |
|---|---|---|---|
| 8,698,406 B2* | 4/2014 | Radermacher | 315/188 |
| 2005/0057190 A1* | 3/2005 | Fujiwara | H05B 41/2806 315/291 |
| 2010/0225251 A1* | 9/2010 | Maruyama | H05B 33/0815 315/307 |
| 2011/0156612 A1* | 6/2011 | Kanamori et al. | 315/291 |
| 2011/0193495 A1* | 8/2011 | Mishima et al. | 315/307 |
| 2012/0299512 A1* | 11/2012 | Watanabe et al. | 315/307 |

\* cited by examiner

*Primary Examiner* — Jason M Crawford
(74) *Attorney, Agent, or Firm* — Muncy, Geissler, Olds & Lowe, P.C.

(57) ABSTRACT

The light-emitting device disclosed herein comprises a step down circuit and a current limit device, wherein the step down circuit prevents the current signal provided to the light-emitting device larger than the rating current value of the light-emitting device. Moreover, the current limit device only limits current signal while the power supply surges. The two stages protect circuit turn less power to heat.

15 Claims, 9 Drawing Sheets

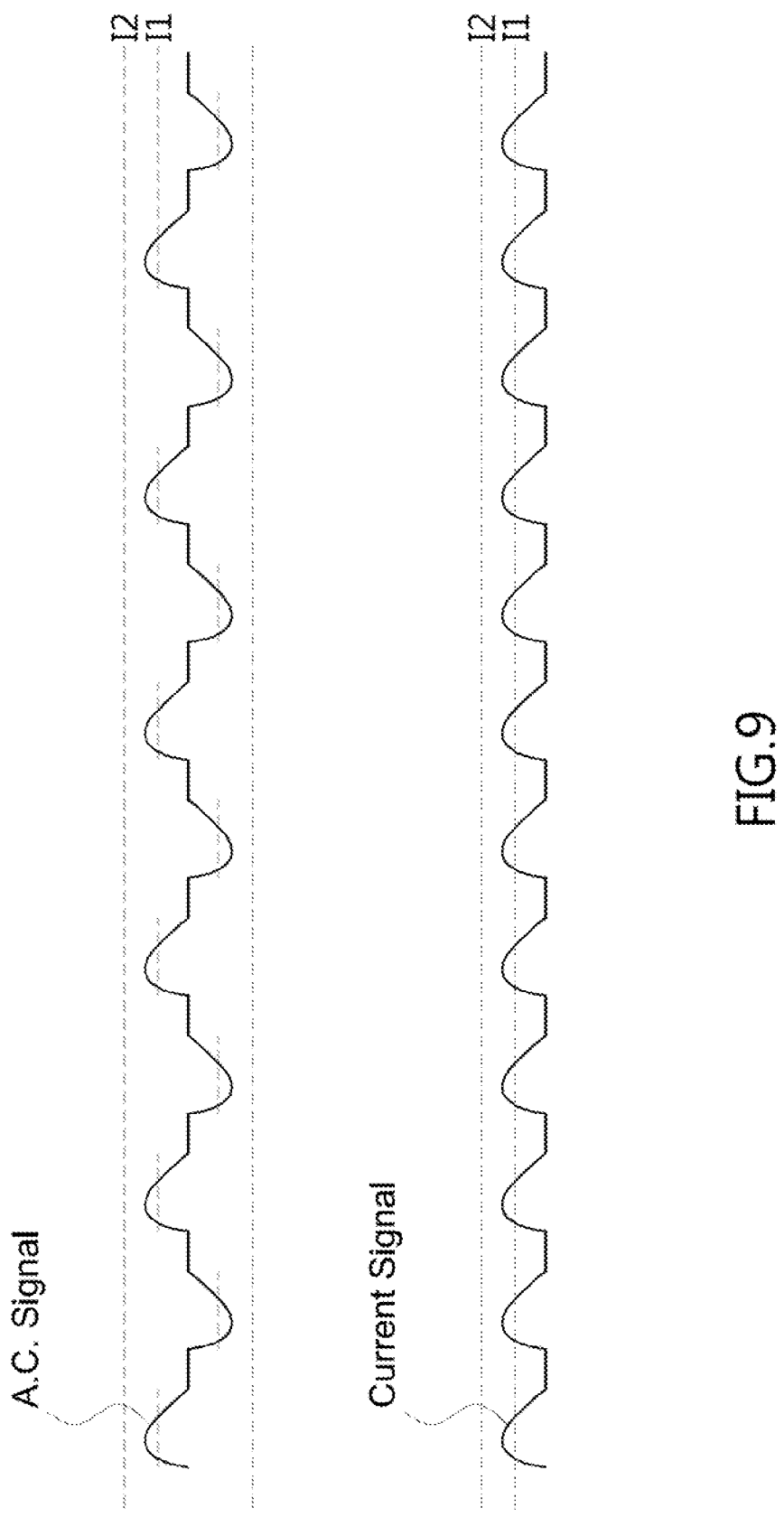

LIGHT-EMITTING DEVICE CIRCUIT AND METHOD OF OPERATING THEREOF

REFERENCE TO RELATED APPLICATION

1. Technical Field

This present application relates to a light-emitting device circuit, and more particularly to a light-emitting device circuit having a current limit function and the method of operating.

2. Background of the Disclosure

The light-emitting diodes (LEDs) of the solid-state lighting elements have the characteristics of low heat generation, long operational life, small volume, and quick response, so the LEDs have been widely used in various ways. Recently, efforts have been devoted to improve the luminance of the LED in order to apply the device to the lighting domain, and further achieve the goal of energy conservation and carbon reduction. In order to procure LED device to the domain of daily life lighting, various control apparatus are designed for different applications such as luminance controller, light sensor, traffic light controller, automobile lighting, power supply circuit, and so on.

Figure 1:
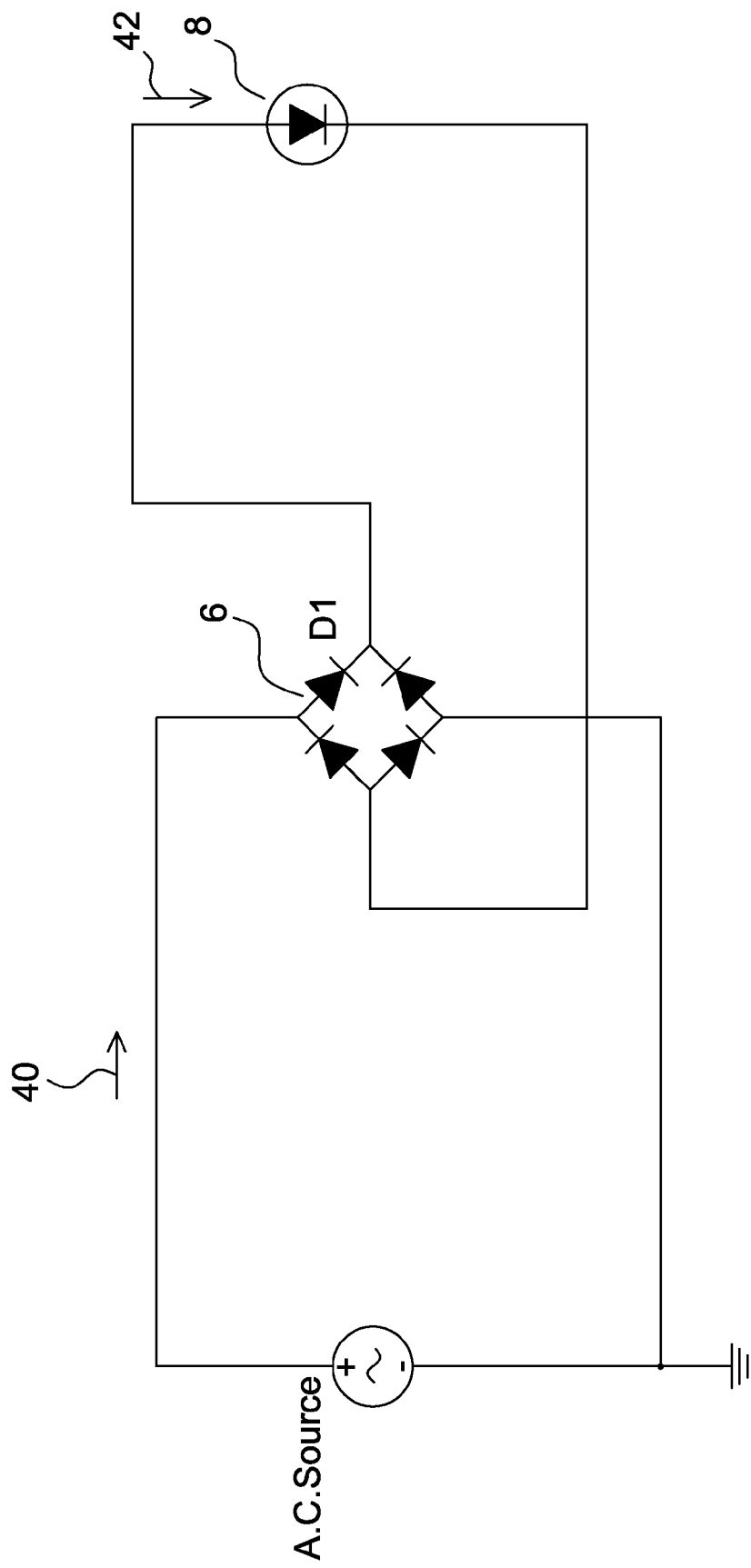
Figure 2:
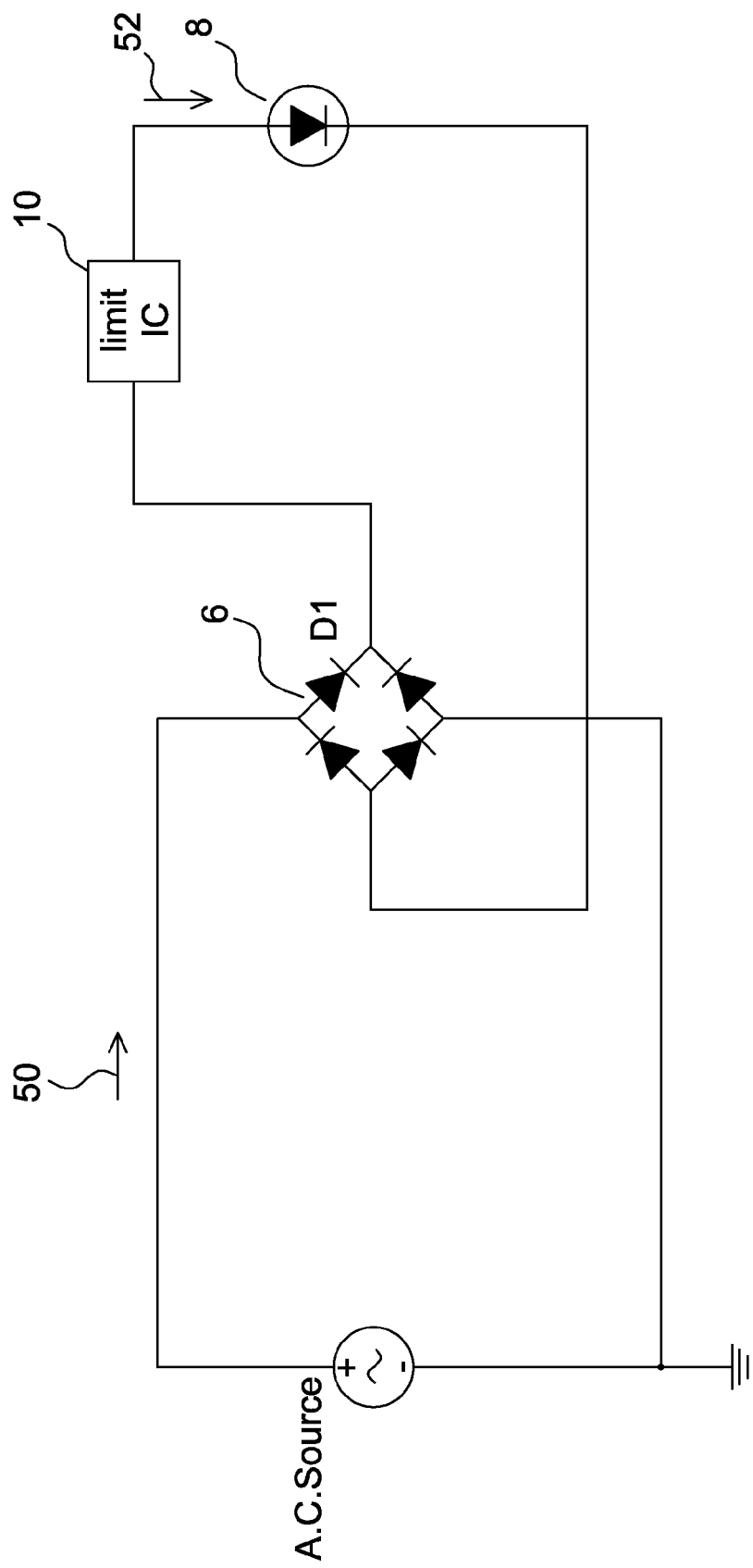

As shown in FIG. 1, a typical LED circuit without current limit function comprises an A.C. source connected to a full-wave bridge rectifier 6 which rectifies the first signal 40 to be a second signal 42 having a positive half waveform with a root-mean-square (RMS) value. The first signal 40 and the second signal 42 can be current signals. In order to protect the LED 8, a current limit IC 10 is further used as shown in FIG. 2. The current limit IC 10 is located between the full-wave bridge rectifier 6 and the LED 8 so the first signal 50 and the second signal 52 are limited. The first signal 50 and the second signal 52 can be current signals.

In order to operate the LED 8 in a safe operation range, the limit IC 10 limits the second signal 52 to be not greater than a specific value. In a conventional way, the specific value is designed to be close to the ideal operating current value of the LED 8 which is less than the rating current value which is the maximally allowable operating current value of the LED 8 and the ideal operating current is the current designed to operate the LED 8 with good photoelectric conversion efficiency. While the ideal operating current value of the LED 8 is 20 mA and the rating current is 60 mA, the specific value of the limit IC 10 to limit the current is typically designed to be 20 mA.

Figure 3:
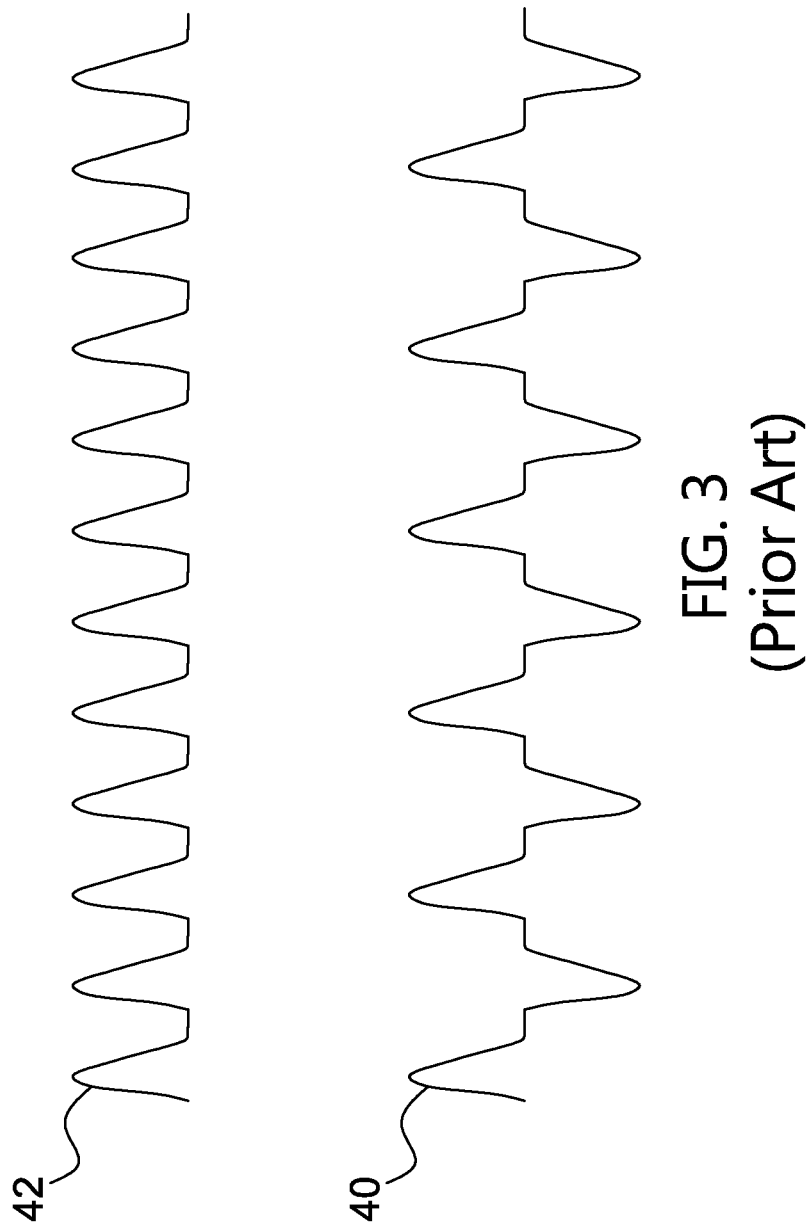
Figure 4:
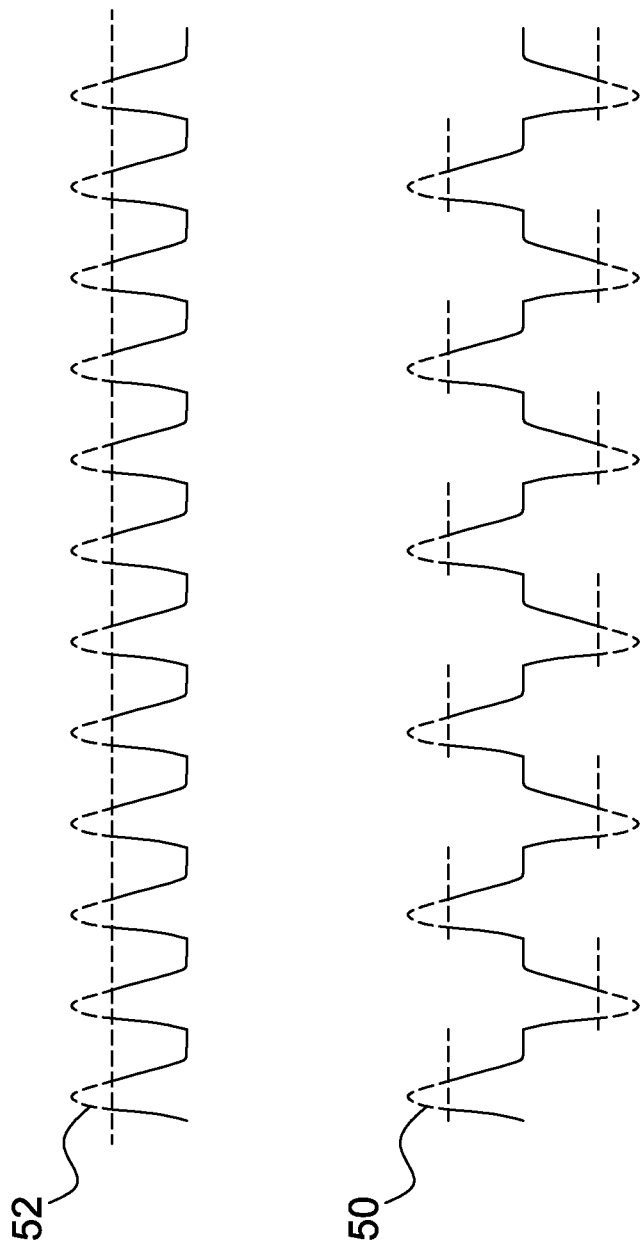

Referring to FIG. 3 and FIG. 4, the first signal 40 is changed to the first signal 50 due to the current limit IC 10 is applied. The second signal 42 is also replaced by the second signal 52, wherein the part of second signal 42 over the specific value is eliminated by the current limit IC 10. The specific value is described as dashed lines in the FIG. 4, and the part of the first signal 50 and second signal 52 exceeding the specific value become useless power. The useless power is turned to heat dissipated by the current limit IC 10.

Although the limit IC 10 protects the LED 8 to be operated in a safe operation range, the limit IC 10 in FIG. 2 turns the part of the first signal 50 larger than the specific vale to useless heat. Besides, the peak value of the first signal 50 is usually designed to be larger than the ideal operating current of the LED 8 so that the RMS value of the first signal 50 can be fitted to the ideal operating current of the LED 8. But the design principle also keeps the current limit IC 10 turning the part of the input power larger than the specific value to useless heat once the A.C. source is applied to the LED circuit.

Although the applied current limit IC protects the LED device from damaging, the power lost by the protection method conflicts with energy saving which is the main reason to use LED as a light source.

SUMMARY OF THE DISCLOSURE

One aspect of the disclosure provides a light-emitting device circuit having a current limit device. The light-emitting device benefits both LED device protection and power saving.

One aspect of the present disclosure provides a light-emitting device circuit, comprising a step down circuit having an alternating current; a rectifier electrically connected to the step down circuit and for rectifying the alternating current; a light emitting device electrically connected to the rectifier, having a rating current value and an ideal operating current value; and a current limit device electrically connected to the light emitting diode having a current limit value, wherein the current limit value is larger than the ideal operating current peak value but less than the rating current value.

BRIEF DESCRIPTION THE DRAWINGS

Figure 5:
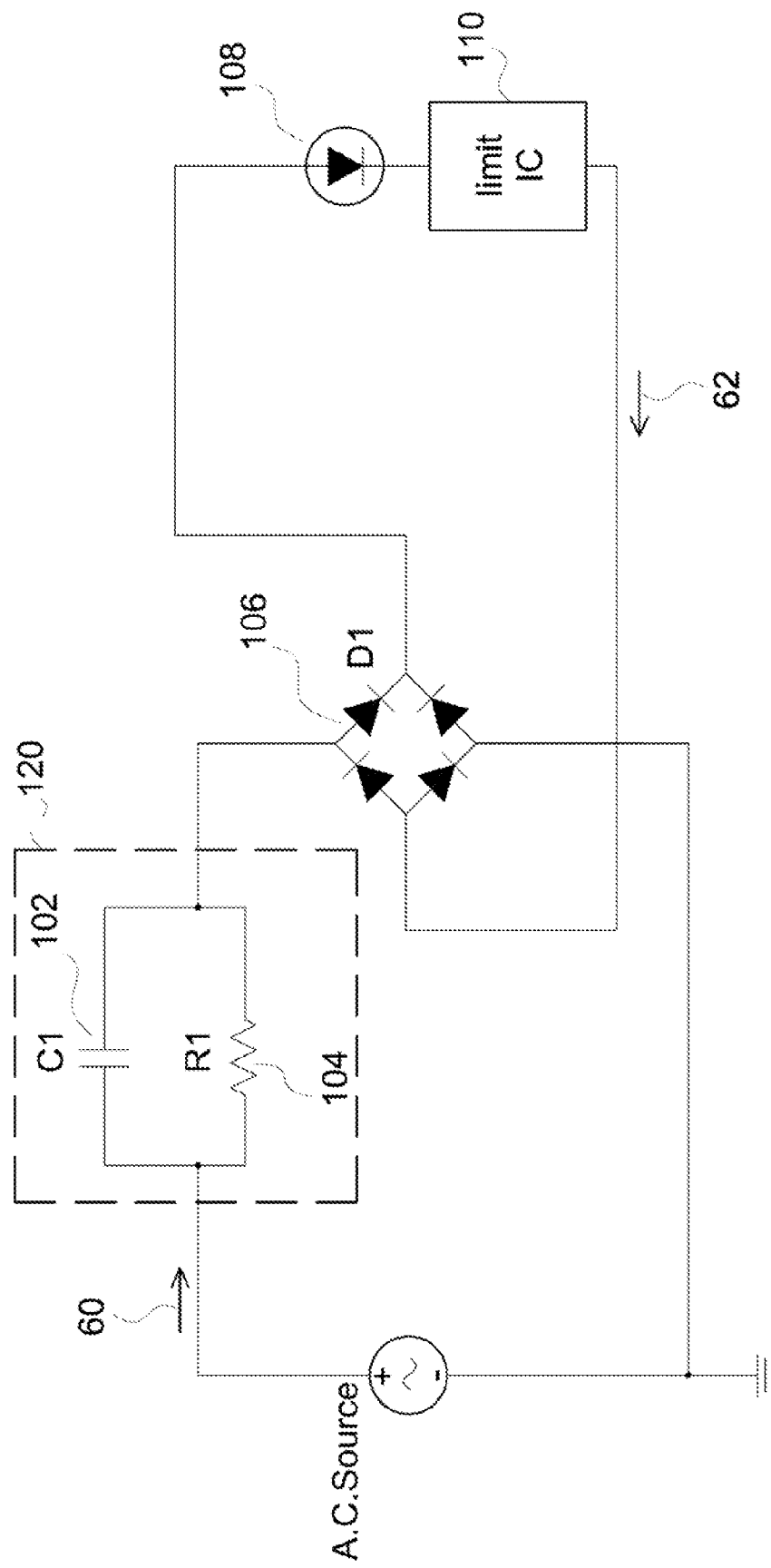
Figure 6:
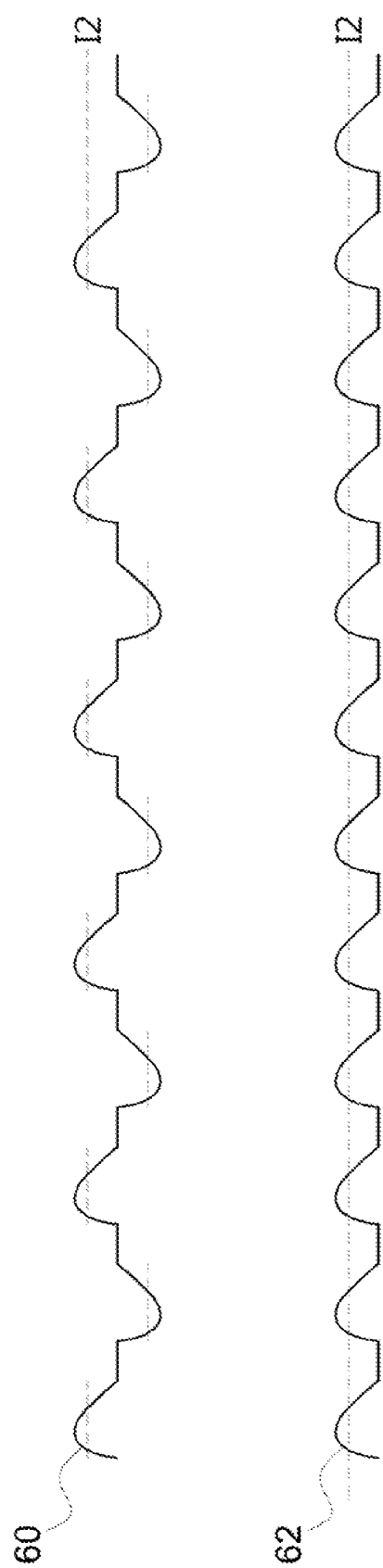
Figure 7:
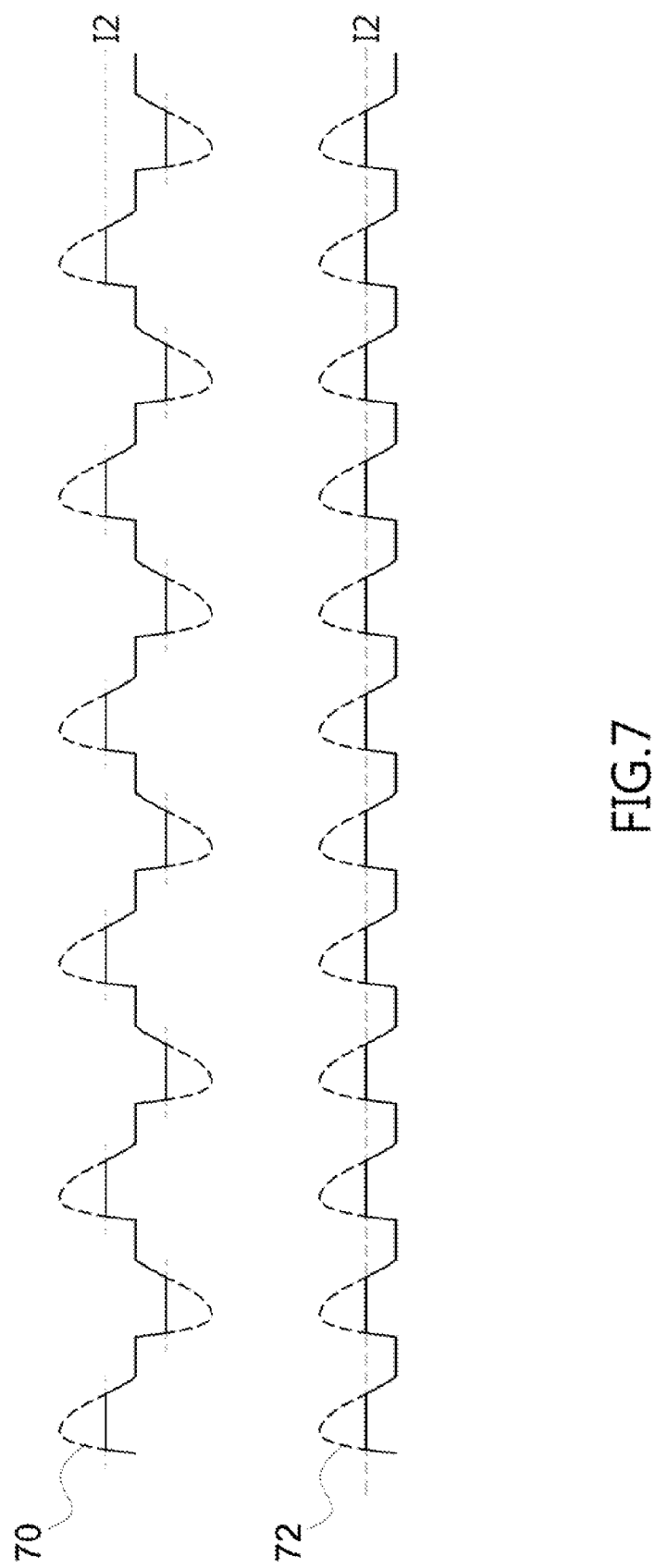
Figure 8:
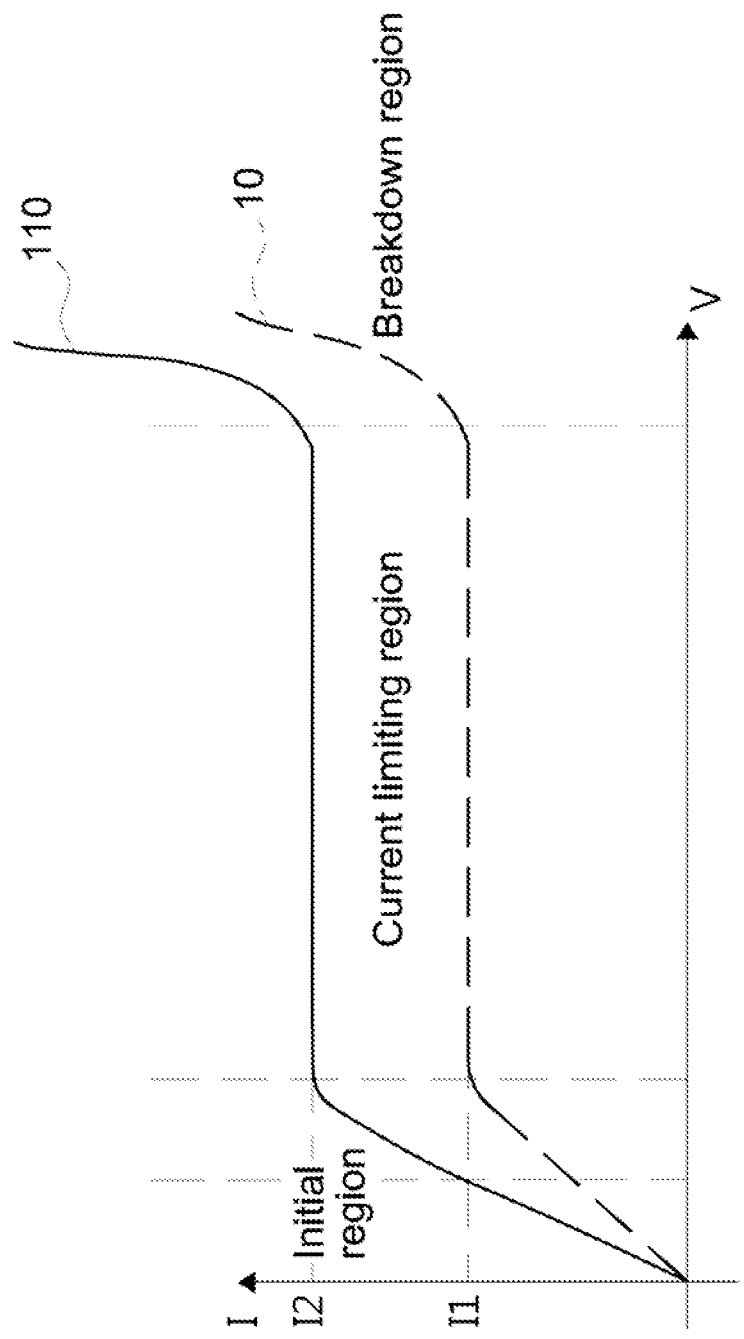

FIG. 1 shows a LED circuit.
FIG. 2 shows a LED circuit with current limit IC.
FIG. 3 shows the waveform of the signals indicated in FIG. 1.
FIG. 4 shows the waveform of the signals indicated in FIG. 2.
FIG. 5 shows one embodiment of the present disclosure.
FIG. 6 shows the waveform of the signals indicated in FIG. 5.
FIG. 7 shows the waveform of the signals in FIG. 5 while A.C. source surges.
FIG. 8 shows the I-V curve of current limit IC 10 and current limit device 110.
FIG. 9 shows the differences of the waveforms with current limit device 110 and current limit IC 10.

DETAILED DESCRIPTION OF THE PREFERRED EMBODIMENTS

FIG. 5 shows a light-emitting device circuit comprises a step down circuit 120 having a capacitor 102 and a resistor 104, a rectifier 106, an LED device 108, and a current limit device 110. An A.C. source applied to the light-emitting device circuit is turned to a first signal 60 by the step down circuit 120, wherein the first signal 60 can be a current signal. To be more specific, the first signal 60 can be adjusted by the resistor 104 in the step down circuit 120 electrically connected to the capacitor 102 in parallel.

The LED device 108 is further designed with an ideal operating current and an operation limitation of a rating current, wherein the rating current represents a maximum current value allowed to operate the LED device 108 without damaging the LED device 108, and the ideal operating current represents the proper current to operate the LED device 108 with performance like luminance per watt, brightness, lifetime of LED device, and heat generation rate. The step down circuit 120 adjusts the A.C. source to a first signal 60, wherein the absolute value of the first signal 60 peak values is not greater than the rating current value of the LED device 108.

The first signal 60 is rectified to be a second signal 62 by the rectifier 106 which is electrically connected to the step down circuit 120, wherein the second signal 62 can be a current signal and be influenced by both the capacitor 102 within the step down circuit 120 and the LED device 108. In one embodiment, the rectifier 106 is a half-wave bridge rectifier, and in another embodiment, the rectifier is a full-wave bridge rectifier.

The second signal 62 is provided to the LED device 108 which is electrically connected to the rectifier 106. The RMS value of the second signal 62 is the average operating current value of the LED device 108. In one embodiment, the RMS value of the second signal 62 is designed to be identical to the ideal operating current of the LED device 108. In one embodiment, the LEE) device 8 comprises a high voltage light emitting diode.

Since the A.C. source is adjusted to be the first signal 60 by the step down circuit 120, the peak value of the first signal 60 is less than the rating current of the LED 108. Furthermore, a current limit device 110 electrically connected to the LED device 108 is used to protect the LED device 108 when the A.C. source surges. During normal operation, the step down circuit 120 limits the peak of the first signal 60 to be less than the rating current, but the current limit device 110 does not limit the first signal 60. Once the A.C. source surges and the first signal 60 and the peak of the second signal 62 are expected to be larger than the rating current, the current limit device 110 is activated to limit the peak of the first signal 60 and the second signal 62 to be less than a fixed current limit value stored in the current limit device 110. In other words, the current limit device 110 only limits the current value to be less than a current limit value in order to prevent the A.C. source surges or any mechanisms which enlarge the first signal 60 and the second signal 62 to be larger than the rating current value of the LED device 108.

The current limit value is designed to be greater than the ideal operating current of the LED device 108 but not greater than the rating current of the LED device 108. In one embodiment, the current limit value is designed to be greater than half of the rating current value. In one embodiment, the current limit value is tunable. In one embodiment, the current limit device 110 comprises digital circuits or analog circuits to limit the first signal 60 and the second signal 62. In other words, the current limit value can be adjusted in a digital way or analog way.

FIG. 6 shows the waveform of the signals in the embodiment described in FIG. 5. The first signal 60 is converted to be the second signal 62 by the full-wave bridge rectifier 106. In a normal case, the peak values of the first signal 60 and the second signal 62 are only limited by the step down circuit 120. The peak values of the waveforms are less than the current limit value I2 shown in FIG. 6 and also less than the rating current value (not shown in FIG. 6) of the LED device 108. When the A.C. source surges, the peak values of the first signal 60 and the second signal 62 are enlarged to be the first signal 70 and the second signal 72 as shown in FIG. 7. The first signal 70 and the second signal 72 can be current signals. Once the A.C. source surges, the current limit device 110 limits the first signal 70 and the second signal 72 to be less than a current limit value. Thus part of the first signal 70 and the second signal 72 which exceed the current limit value I2 are eliminated as shown in FIG. 7. The part of the waveforms larger than the current limit value I2 are eliminated by the current limit device 110 described as dashed lines in the FIG. 6.

When the same LED device is used, the current limit IC 10 in FIG. 2 limits the peak value of the second signal 52 to be equal to or less than the ideal operating current of the LED device when the A.C. source is applied, but the current limit device 110 in FIG. 5 does not limit the peak value of the second signal 62 to be equal to or less than the rating current of the LED device until the A.C. source surges. Referring to FIG. 8, the I-V curve of the current limit IC 10 and the current limit device 110 are described while applied in a light-emitting device circuit. The initial region indicated in FIG. 8 represents that the signals in the light-emitting device circuit are less than the current limit value I1 of the current limit IC 10 or the current limit value I2 of the current limit device 110. The breakdown region indicated in FIG. 8 represents that the operation condition is over the operation range of the current limit IC 10 and the current limit device 110.

The current limiting region in FIG. 8 represents that the current limit IC 10 and the current limit device 110 limit the signals in the light-emitting device circuit. When the same A.C. source and the same LED device are adopted in the circuits shown in FIG. 2 and FIG. 5, the current limit IC 10 in FIG. 2 limits the first signal 50 and the second signal 52 once the A.C. source is applied. Meanwhile, the circuit comprising a current limit device 110 in FIG. 5 does not limit the signals until the A.C. source surges or some other mechanisms to enlarge the signals greater than the rating current of the LED device. In other words, the current limit IC 10 works as a fixed current source since the A.C. source is applied in FIG. 2 due to the current limit value I1 is designed to be equal to or less than the ideal operating current of the LED device 8; the current limit device 110 works as a fixed current voltage only when the A.C. source surges and works as a resistor while the normal operation without eliminating the A.C. source to be less than the current limit value I2 which turns the power into heat.

Referring to FIG. 9, the part of the first signal or the second signal over the current limit value I1 are eliminated when the current limit IC 10 is adopted but the same signals are not changed while the current limit device 110 is adopted because the current limit value I2 is larger than peak values of the waveforms. Since the current limit value I2 is larger, the amount of the waveforms larger than the current limit value I2 which becomes heat dissipated by the current limit device 110 is less.

The method of operating a light-emitting device circuit presented comprises steps of providing an alternating current source, rectifying the first signal, operating a light emitting device, and limiting the first signal. The light-emitting device is designed to be operated by an ideal operating current which is not larger than a rating current value to prevent from damaging the light-emitting device.

The steps of operating a light-emitting device circuit further comprises providing an A.C. source and limiting the A.C. source to be a first signal having an alternating current signal peak value by a step down circuit. The absolute value of the peak value of the first signal is limited to be not greater than the rating current value of the LED device. In one embodiment, the step down circuit comprises a resistor and a capacitor electrically connected in parallel.

The first signal is rectified to be a second signal by a rectifier, wherein the rectifier is a half-wave bridge rectifier or a full-wave bridge rectifier.

The second signal is provided to the light emitting device which has an ideal operating current and a rating current. In one embodiment, the RMS value of the second signal is identical to the ideal operating current value and the peak value of the second signal is larger than the ideal operating current value. Since the A.C. source provides a first signal having an alternating current peak value less than the rating current by a step down circuit, the current limit IC does not limit the A.C. source unless the A.C. source surges or any mechanism enlarges the current signal to be larger than the rating current value of the LED device. The current limit value within the current limit IC is not greater than the rating current value. In another embodiment, the current limit value is greater than half of the rating current value.

Unlike conventional circuit adopts one current limit IC to protect LED device, the present disclosure adopts two stages protecting method comprising providing a step down circuit to limit signals less than the rating current of the LED device without wasting energy and providing a current limit IC to limit signals only while the A.C. source surges which wastes less energy than conventional circuit does.

It will be apparent to those having ordinary skill in the art that various modifications and variations can be made to the devices in accordance with the present disclosure without departing from the scope or spirit of the disclosure. In view of the foregoing, it is intended that the present disclosure covers modifications and variations of this disclosure provided they fall within the scope of the following claims and their equivalents.

What is claimed is:

1. A light-emitting device circuit, comprising:
    a step down circuit configured to receive an AC signal with a profile having a highest portion, a lower portion with a highest value, and a flat portion lower than the highest portion and the lower portion, and provide an alternating current after removing the highest portion while substantially keeping the lower portion unchanged;
    a rectifier electrically connected to the step down circuit and configured to rectify the alternating current;
    a light-emitting device electrically connected to the rectifier and having a rating current value and an ideal operating current peak value; and
    a current limit device electrically connected to the light-emitting device and configured to limit a current for passing through the light-emitting device when the current is greater than a current limit value,
    wherein the current limit value is larger than the ideal operating current peak value and less than the rating current value, and
    wherein the highest value is greater than the rating current value.

2. The light-emitting device circuit according to claim 1, wherein the rectifier comprises a half-wave rectifier or a full-wave rectifier.

3. The light-emitting device circuit according to claim 1, wherein the step down circuit comprises a capacitor.

4. The light-emitting device circuit according to claim 3, wherein the step down circuit comprises a resistor electrically connected to the capacitor in parallel.

5. The light-emitting device circuit according to claim 1, wherein the light-emitting device comprises a high voltage light-emitting diode.

6. The light-emitting device circuit according to claim 1, wherein the current limit value is greater than half of the rating current value.

7. The light-emitting device circuit according to claim 1, wherein the current limit value is a fixed value stored in the current limit device.

8. The light-emitting device circuit according to claim 1, wherein the current limit value is tunable.

9. The light-emitting device circuit according to claim 1, wherein the current limit device comprises an analog circuit or a digital circuit.

10. A method of operating a light-emitting device circuit, comprising steps of:
    receiving an input signal with a profile having a highest portion, a lower portion with a highest value, and a flat portion lower than the highest portion and the lower portion;
    providing a first signal having a first peak value by a step down circuit after removing the higher portion and keeping the lower portion unchanged;
    providing a second signal having a second peak value by rectifying the first signal;
    providing a light-emitting device having an ideal operating current with a third peak value;
    operating the light-emitting device with the second signal, wherein the light-emitting device comprises a rating current value;
    providing a current limit device having a current limit value which is larger than the third peak value; and
    converting the second peak value to be not greater than the current limit value by the current limit device only when the second peak value is larger than the current limit value,
    wherein the highest value, the first peak value and the current limit value are not greater than the rating current value.

11. The method of operating a light-emitting device circuit according to claim 10, wherein the step of rectifying the first signal comprises providing a half-wave rectifier or a full-wave rectifier.

12. The method of operating a light-emitting device circuit according to claim 10, wherein the step down circuit comprises a resistor and a capacitor electrically connected in parallel.

13. The method of operating a light-emitting device circuit according to claim 10, wherein the current limit value is greater than half of the rating current value.

14. The method of operating a light-emitting device circuit according to claim 10, wherein the step of providing a first signal comprises modifying a current provided by an A.C. source to be the first signal.

15. A method of operating a light-emitting device circuit, comprising steps of:
    providing a light-emitting device having a rating current value and an ideal operating current with a third peak value;
    receiving an input signal;
    providing a first signal having a first peak value by a step down circuit after removing a portion of the input signal, wherein the portion has a lowest value larger than the rating current value;
    providing a second signal having a second peak value by rectifying the first signal;
    operating the light-emitting device with the second signal;
    providing a current limit device having a current limit value which is larger than the third peak value; and
    converting the first signal and the second signal, so that the second peak value and the first peak value are not greater than the current limit value only when any of the first peak value or the second peak value is larger than the current limit value,
    wherein the first peak value and the current limit value are not greater than the rating current value.

* * * * *